(12) United States Patent
Labitzke et al.

(10) Patent No.: US 7,822,527 B2
(45) Date of Patent: Oct. 26, 2010

(54) METHOD AND DEVICE FOR TRANSMITTING AN IDENTIFIER FOR THE TYPE OF A GENERATOR TO A CONTROL UNIT OF A MOTOR VEHICLE

(75) Inventors: Herbert Labitzke, Markgroeningen (DE); Helmut Suelzle, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 809 days.

(21) Appl. No.: 10/594,482

(22) PCT Filed: Jan. 31, 2005

(86) PCT No.: PCT/EP2005/050394

§ 371 (c)(1),
(2), (4) Date: Jun. 8, 2007

(87) PCT Pub. No.: WO2005/093941

PCT Pub. Date: Oct. 6, 2005

(65) Prior Publication Data

US 2007/0282518 A1 Dec. 6, 2007

(30) Foreign Application Priority Data

Mar. 27, 2004 (DE) .................. 10 2004 015 126

(51) Int. Cl.
*G06F 19/00* (2006.01)
*H02P 9/30* (2006.01)

(52) U.S. Cl. ........................... 701/101; 322/28

(58) Field of Classification Search ................ 701/101, 701/102, 115; 322/24, 28, 36, 26
See application file for complete search history.

(56) References Cited

U.S. PATENT DOCUMENTS 6,384,551 B1 * 5/2002 Watanabe .................. 318/139
7,098,628 B2 * 8/2006 Maehara et al. ............. 322/28

FOREIGN PATENT DOCUMENTS

| DE | 43 32 078 | 3/1995 |
| DE | 196 11 908 | 10/1997 |
| DE | 199 49 031 | 4/2001 |
| EP | 0 783 994 | 7/1997 |
| EP | 1 193 825 | 4/2002 |

* cited by examiner

*Primary Examiner*—Hieu T Vo
(74) *Attorney, Agent, or Firm*—Kenyon & Kenyon LLP

(57) ABSTRACT

A method for transmitting an identifier for the type of a generator from the regulator of the generator to a control unit of a motor vehicle having the following steps: detection of a starting process of the motor vehicle and automatic transmission of the identifier from the regulator via an analog signal line to the control unit following the detection of the starting process. Furthermore, also described is a device for transmitting an identifier for the type of a generator, having a generator, a regulator provided for regulating the generator and a control unit connected to the regulator via an analog signal line, the regulator being provided so as to transmit automatically the identifier via the analog signal line to the control unit following a detection of a starting process.

12 Claims, 1 Drawing Sheet

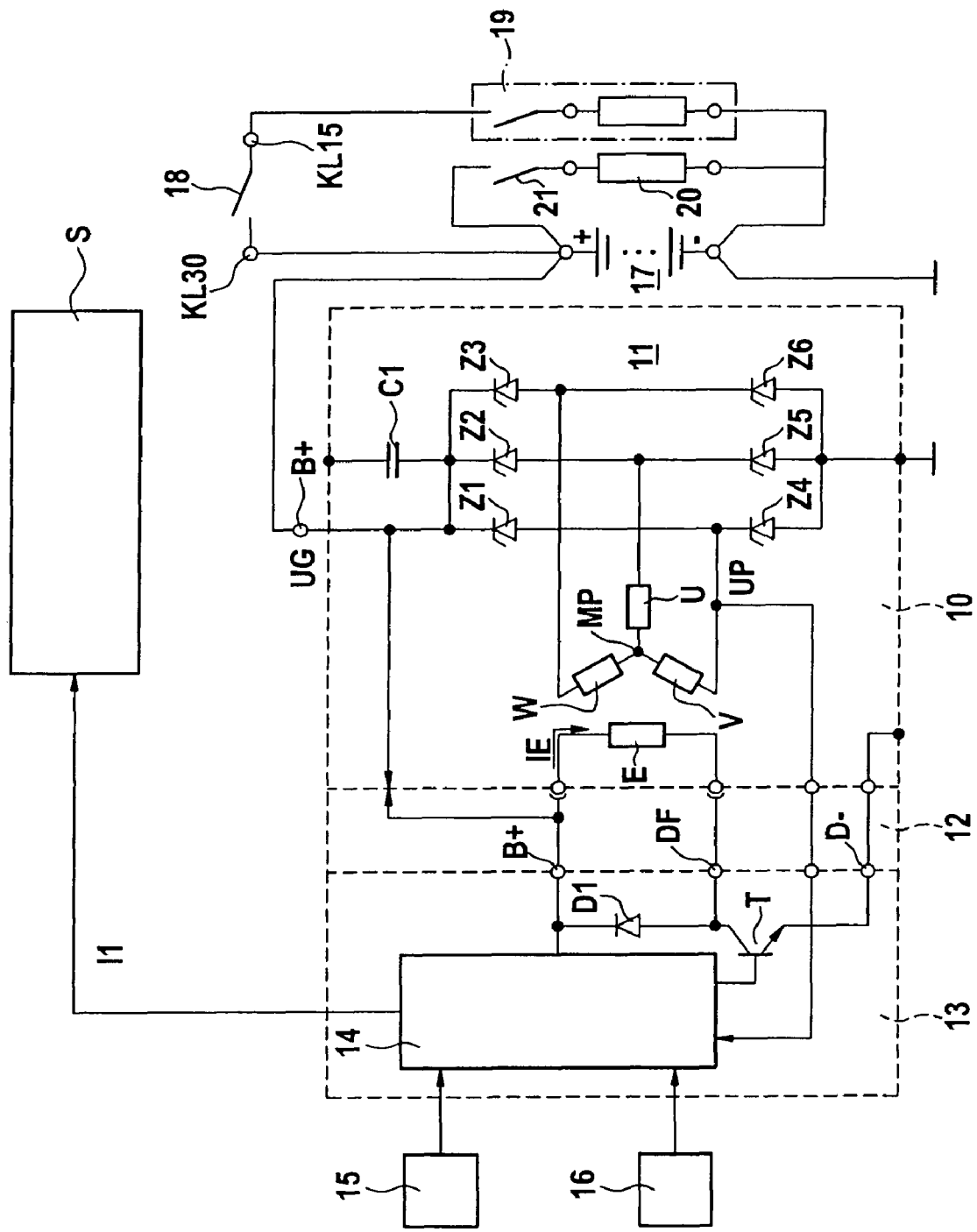

METHOD AND DEVICE FOR TRANSMITTING AN IDENTIFIER FOR THE TYPE OF A GENERATOR TO A CONTROL UNIT OF A MOTOR VEHICLE

FIELD OF THE INVENTION

The present invention relates to a method and device for transmitting an identifier for the type of a generator to a control unit of a motor vehicle.

BACKGROUND INFORMATION

A vehicle electrical system is already known which includes a vehicle battery, loads and a starter. The vehicle battery is charged in vehicle operation by a generator which is regulated by a voltage regulator. The voltage regulator is connected to the engine control unit of the vehicle.

In recent years, the proportion of the generator in the total torque of the vehicle is rising ever more rapidly. In order to be able to control the idling behavior of the vehicle, the generator is included in the consideration of a torque model of the engine control. For this purpose, for example, the current torque of the generator is calculated by using characteristics maps stored in the engine control. In order to be able to carry out this calculation it is necessary to know the type and thus the size of the generator. In vehicles that have a regulator having a digital interface, this information about the type of generator is supplied to the control unit via the mentioned digital interface.

In vehicles that have a regulator without a digital interface and in which the control unit does not know the type of generator, it is known to use an average value regarding the generator types used in an application for purposes of calculating the current torque of the generator. The result obtained is accordingly imprecise.

A device is known from German Published Patent Application No. 199 49 031 for automatically detecting the generator type of a motor vehicle. This known device has a generator, which is connected via an interface to a control unit, and a battery. The control unit contains a memory in which data of different generator types are stored. Furthermore, the control unit is configured in such a way that by switching an electrical load on and off the voltage characteristic at the generator can be detected and the generator type can be determined by comparison with the stored data.

SUMMARY OF THE INVENTION

According to the present invention, information about the type and thus the size of the existing generator is transmitted to the control unit even when the regulator has no digital interface. This transmission occurs automatically following the detection of a starting process of the motor vehicle via an analog signal line provided between the regulator and the control unit.

This analog signal line is preferably the same signal line via which the signal DFM, which corresponds to the current pulse control factor of the output stage of the regulator, is transmitted to the control unit following the conclusion of the starting process, that is, in the normal regulating operation of the generator. This information about the pulse control factor of the output stage of the regulator is not relevant for the control unit during the starting process. Consequently, this starting phase may be used to transmit from the regulator to the control unit an identifier about the type of the existing generator.

This transmission of the identifier preferably occurs in the form of a sequence containing information for a pulse control factor that is characteristic of the type of generator.

BRIEF DESCRIPTION OF THE DRAWING

The FIGURE shows an exemplary embodiment to explain the present invention.

DETAILED DESCRIPTION

The FIGURE shows the components of a voltage supply system in a motor vehicle that are essential for understanding the present invention. The voltage supply system has a three-phase generator 10, which is driven by an internal combustion engine (not shown) and includes phase windings U, V and W. These are arranged in the shape of a star and are connected to one another via a common point MP. When the generator is turning, phase voltage UP is generated at the output of the phase windings. Phase windings U, V and W are connected to a rectifier bridge 11, which includes Zener diodes Z1 through Z6. The rectifier bridge is on the one hand connected to ground and leads on the other hand to connection B+ of the generator, at which the rectified output voltage UG supplied by the generator is provided Furthermore, generator 10 has an exciter winding E, which is connected via brush holder 12 to connections B+ and DF of voltage regulator 13. Between connection DF and connection D− of voltage regulator 13, which is connected to ground via brush holder 12, a switching transistor T is provided, via which exciter current IE may be regulated by exciter winding E. The base of this switching transistor T is controlled by a control unit 14 of voltage regulator 13.

Control unit 14 is supplied by sensor unit 15 with sensor signals, on the basis of which the control unit detects whether the motor vehicle is starting. Sensor unit 15 contains for example an acceleration sensor, which is attached at a location of the internal combustion engine at which particularly high acceleration values occur. The acceleration values occurring after starting the engine in the starting phase allow for a reliable detection of a starting process.

As a further input signal, control unit 14 is supplied with phase voltage UP, which is tapped off, for example, at phase winding V and is transmitted via appropriate connections on brush holder 12 or voltage regulator 13.

Connection B+ of regulator 13 and the associated connection of exciter winding E are connected to generator terminal B+, it being possible for the connection to occur within generator 10 via brush holder 12. A diode D1 is connected between connection B+ of voltage regulator 13 and its connection DF.

Furthermore, three-phase generator 10 has a capacitor C1, which is connected between the cathodes of Zener diodes Z1, Z2, Z3 and ground.

The vehicle electrical system shown in the FIGURE has a battery 17, the positive pole of which is connected to generator terminal B+ and the negative pole of which is connected to ground. The positive pole of battery 17 is furthermore connected to terminal 30, which leads via ignition switch 18 to terminal 15 and thus to starter 19. The loads are indicated by the reference numeral 20. They may be connected via switching element 21 to the positive pole of battery 17.

The device shown in the FIGURE, which is used to provide a regulated output voltage for the vehicle electrical system, has only two connections between generator 10 and the vehicle electrical system, namely, connection B+, off of which the controlled and rectified output voltage UG of generator 10 is tapped for supplying the vehicle electrical system, and the common ground connection D–. The voltage supply for exciter winding E or the voltage for generating exciter current IE is tapped off inside the generator via terminal B+. The connection between the exciter winding and ground is established with the aid of transistor T if a corresponding control signal is supplied to the base of transistor T. When the generator at a standstill, transistor T cuts off and no exciter current is flowing. If the internal combustion engine is started, then the generator begins to turn and an exciter current is required. This current for the pre-excitation is supplied directly by connection B+ as soon as voltage regulator 13 detects the start of the internal combustion engine. Different variants are possible for detecting the start, which are described in the following:

In a first variant, which was already mentioned above, the accelerations occurring during the starting process are registered with the aid of sensor unit 15, which has an acceleration sensor. The output signal of sensor unit 15 is supplied to control unit 14 of voltage regulator 13. It is, for example, a voltage or is prepared to yield a voltage, which is supplied to the base of transistor T of the voltage regulator and switches it on. Sensor unit 15 may also be integrated into voltage regulator 13.

In a second variant, the amplitude of the phase voltage UP induced via the residual magnetism is analyzed. This phase voltage is tapped off, for example, at phase V and is supplied to circuit 14. If the amplitude of the phase voltage reaches a boundary value, then the transistor of voltage regulator 13 is triggered and the exciter current is switched on. Since the phase voltage or the phase signal in regulator 13 is present in any case, no additional lines or connections are needed.

In a third variant, the frequency of phase voltage UP is analyzed. The frequency of the phase voltage induced via the residual magnetism depends on the rotational speed of the generator. Thus, by analyzing this frequency, the rotational speed may be ascertained and compared to a specifiable threshold value. If the frequency of the phase voltage exceeds this boundary value, then a voltage is generated in circuit 14, which is supplied to the base of transistor T and puts this into a conductive state.

In a fourth variant, the voltage characteristic at terminal B+ is analyzed. The characteristic of this voltage during a starting process has some characteristic maxima and minima. If the expected voltage characteristic is detected, then a starting process must have occurred. The detection of the expected voltage characteristic likewise occurs in control unit 14. If a start is detected, then transistor T is in turn triggered and exciter current IE is switched on.

The different variants described above for detecting a start are used to ensure that immediately following the start of the internal combustion engine a sufficient exciter current IE flows through exciter winding E. Once generator 10 has reached the full excitation state, then the exciter current must be limited so that output voltage UG of the generator does not exceed the desired value. Voltage regulator 13 then passes from the pre-excitation operating state over into the normal regulating operation. The switch from pre-excitation to normal regulating operation occurs, for example, via the analysis of the phase signal. As already explained above in connection with the second and third variants, both the amplitude of the phase voltage as well as the frequency of the phase voltage depend on the rotational speed of the generator. The evaluation of the phase signal therefore allows for a determination of the rotational speed. If the rotational speed ascertained from the phase signal reaches another threshold value that is higher than the threshold value used for switching on the exciter current, then this is registered by regulator 13, and regulator 13 transitions into the normal regulating operation, in which transistor T regulates exciter current IE in such a way that a constant output voltage UG arises at generator terminal B+.

If voltage regulator 13, according to one of the above-described variants, has detected that a starting process is occurring, then it automatically transmits via an analog signal line 11 an identifier four the type of generator 10 to control unit S of the motor vehicle. This information regarding the type of generator 10 is stored in a nonvolatile manner in the form of a digital bit combination in a memory 16 associated with control unit 14. It is read out of memory 16 following the detection of a starting process and is converted following the readout into an analog signal assigned to a pulse control factor, which is supplied to control unit S via analog signal line 11.

For example, the following sequence may be transmitted to control unit S via line 11 following the detection of a starting process:

5% 5% 5% 5% 5% 5% Bit1 Bit2 . . . Bitn 5% 5% 5% 5% 5%.

For this purpose, Bit1 . . . Bitn, for example, are defined as follows:

33% control corresponds to a bit having the value 0;
66% control corresponds to a bit having the value 1;
5% control corresponds to a bit without informational content.

By a suitable choice of the values of bits $1 \ldots n$, it is possible to define pulse-width modulated signals that are characteristic for one generator type. This information is also present in control unit S. If—as described above—following the detection of a starting process, such a sequence, which contains a pulse-width modulated signal characteristic of the existing generator type, is automatically transmitted from regulator 13 via analog signal line 11 to control unit S, then the control unit is able to detect the type of the existing generator by analyzing the transmitted sequence and use this for a later calculation of the current torque of the generator by using stored characteristics maps, the transmitted identifier being used for selecting the characteristics map associated with the existing generator type.

Following the end of the starting phase, i.e. in normal regulating operation of generator 10 by regulator 13, signal DFM, which describes the pulse control factor of the output stage of regulator 13, is transmitted to engine control unit S via analog signal line 11. Since this signal DFM is irrelevant for control unit S during the starting phase of the motor vehicle, a sequence may be transmitted in this starting phase, as was described above, which contains an identifier for the type of the existing generator 10 in the form of a pulse-width modulated signal.

In view of the above, the present invention allows for information about the existing type of generator to be transmitted to the control unit of the motor vehicle even though the regulator of the generator has no digital interface.

What is claimed is:

1. A device for transmitting an identifier for a type of a generator, comprising:
   a generator;
   a regulator for regulating the generator;
   an analog signal line; and
   a control unit connected to the regulator via the analog signal line, wherein:
      the regulator transmits automatically the identifier via the analog signal line to the control unit following a detection of a starting process.

2. The device as recited in claim 1, further comprising:
a memory for storing the identifier in digital form.

3. The device as recited in claim 2, wherein:
the regulator converts the identifier stored in digital form into a sequence containing information about a pulse control factor corresponding to the type of generator, and
the regulator transmits the sequence via the analog signal line to the control unit.

4. The device as recited in claim 1, further comprising:
an arrangement for detecting the starting process.

5. The device as recited in claim 4, wherein the arrangement for detecting includes a sensor unit containing an acceleration sensor.

6. The device as recited in claim 4, wherein the arrangement for detecting analyzes an amplitude of a phase voltage.

7. The device as recited in claim 4, wherein the arrangement for detecting analyzes a frequency of a phase voltage.

8. The device as recited in claim 4, wherein the arrangement for detecting analyzes a voltage characteristic of a voltage provided at a terminal B+ of the generator.

9. A method for transmitting an identifier for a type of a generator from a regulator of the generator to a control unit of a motor vehicle, comprising:
detecting a starting process of the motor vehicle; and
automatically transmitting the identifier from the regulator via an analog signal line to the control unit following a detection of the starting process.

10. The method as recited in claim 9, wherein the analog signal line is used, following a completion of the starting process, in regulating an operation for transmitting a signal corresponding to a pulse control factor of an output stage of the regulator.

11. The method as recited in claim 9, wherein the step of automatically transmitting is in the form of a sequence containing information about a pulse control factor characteristic of the type of the generator.

12. The method as recited in claim 11, wherein:
information about the pulse control factor characteristic of the type of generator is stored as a multiple-bit word, prior to an initial operation of the regulator, in a non-volatile manner in a memory associated with the regulator,
the information is read out from the memory following the detection of the starting process, and
the information is converted following a readout into an analog signal associated with the pulse control factor.

* * * * *